Sept. 1, 1942.   J. O. PARR, JR   2,294,627
SEISMIC SURVEYING
Filed March 31, 1941
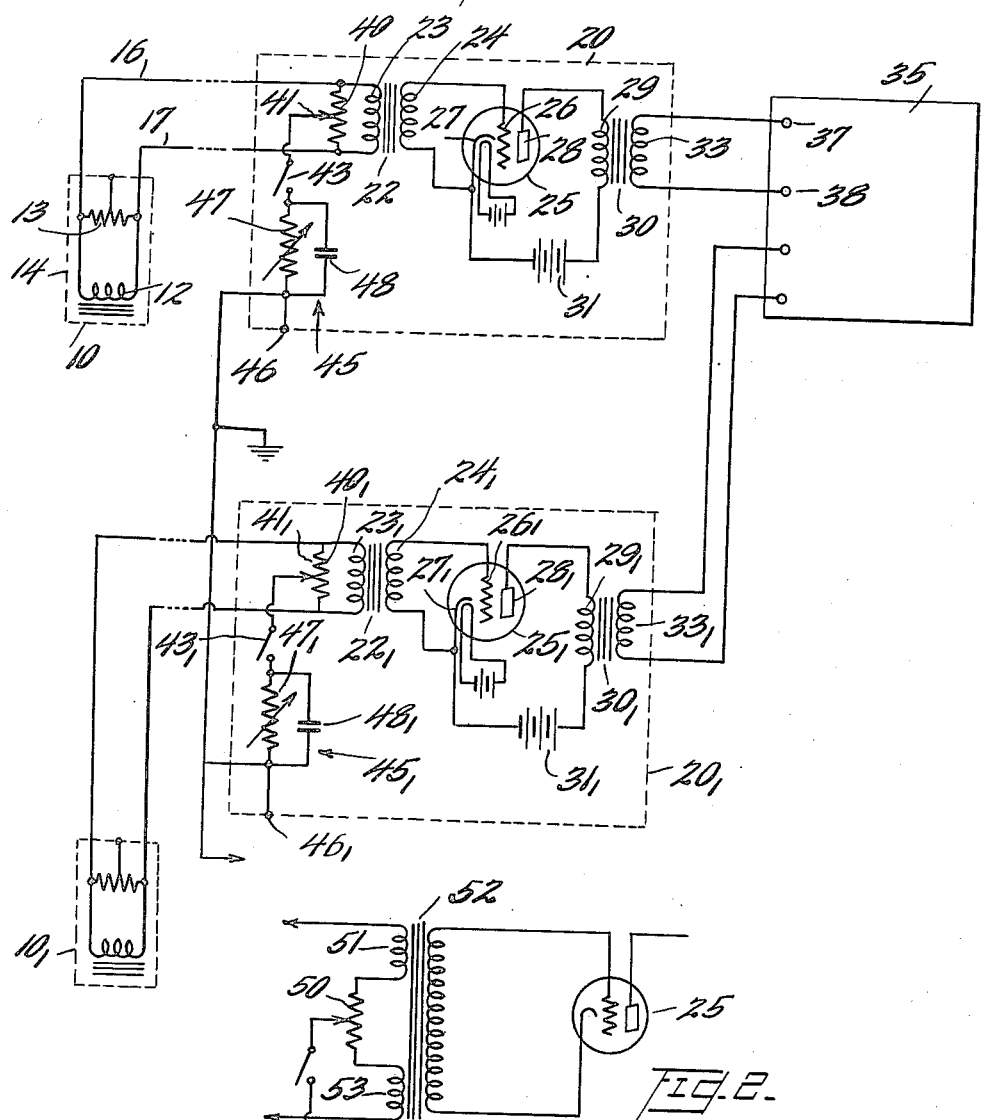

Patented Sept. 1, 1942

2,294,627

UNITED STATES PATENT OFFICE 2,294,627

SEISMIC SURVEYING

Josephus O. Parr, Jr., San Antonio, Tex., assignor to Olive S. Petty, San Antonio, Tex.

Application March 31, 1941, Serial No. 386,174

6 Claims. (Cl. 177—352)

This invention relates to methods and apparatus for use in seismic surveying and has for its principal object the reduction or elimination of the effect of extraneous and undesired electrical disturbances, and particularly such disturbances as commonly occur when surveying operations are conducted in the vicinity of alternating current power lines and electrical equipment.

The preferred method of seismic surveying in use at the present time consists essentially in setting up a seismic disturbance by firing an explosive charge on or or near the surface of the earth, receiving the resultant seismic impulses at a plurality of spaced points remote from their source, converting the seismic impulses into electrical impulses, and transmitting the electrical impulses to a common and convenient point for suitable amplification and recording. The apparatus used to carry out this method may include a plurality of separate devices, located at the said spaced points, for receiving the seismic waves and converting the same into electrical energy, such a device being referred to herein for convenience as a seismometer. The energy from each seismometer may be transmitted over a pair of conductors to a separate unit for electrically amplifying the same, and the amplified signal energy then recorded, energy derived from the several seismometers being commonly recorded on a single sensitized sheet by a suitable optical system.

The equipment employed for this purpose is extremely sensitive, and comparatively slight extraneous electrical disturbances interfere seriously with the recording of the signal and the subsequent correct interpretation of the record. One of the principal sources of such extraneous disturbances is the intense electrical field in the vicinity of alternating current conductors and equipment, particularly where proper care has not been exercised in the balancing and grounding of such equipment. The disturbances may be introduced into the seismic apparatus in various ways. For example, ground currents set up by alternating current systems may leak into the conductors by means of which signal energy is transmitted from the various detectors to the common point of signal amplification; when the conductors and the ground are moist, such leakage may be exceedingly large, differing in amount for the several conductors. Again, current flow may be induced in the conductors by an external magnetic field; it has heretofore been proposed to minimize the effect of such induced current by equalizing the resulting potential on each pair of conductors, as suggested for example, in the patent to Woodyard et al., No. 2,164,196, granted June 27, 1939.

I have found, however, that such a method of potential equalization, while helpful under some circumstances in reducing the effect of A. C. disturbances, is not a satisfactory solution of the problem, since there are other sources of disturbance which predominate under some conditions and which cannot be eliminated by this method. For example, even though the disturbing potential on the conductor pair is balanced adjacent the amplifier, a voltage may be induced in the secondary winding of the usual amplifier input transformer as the result of the capacity between the transformer windings when the potential of the primary winding varies from the ground potential in response to A. C. leakage. Again, A. C. disturbance may be induced in the amplifier by electromagnetic or electrostatic coupling with the disturbing source, as can be shown by the presence of such disturbances in the record when the signal conductors are removed from the amplifier. Various other sources of disturbance are found, such as electromagnetic pick-up in the seismometer, electrostatic pick-up in the conductors from the seismometer to the amplifier, and, in the case of apparatus in which the several amplifiers of a system are grounded or otherwise connected, by flow from one amplifier to another.

It is therefore an object of the instant invention to introduce in the system associated with a given seismometer, an A. C. component of which the phase is so adjusted as substantially to balance out and thereby counteract the overall extraneous A. C. electrical disturbance. Preferably the counteracting component is introduced in the system at each amplifier.

More specifically, it is an object of the invention to provide, in combination with seismic apparatus of the character generally described hereinbefore, means including a phase shifting device connecting the several amplifiers of the system, whereby the desired counteracting A. C. component introduced in each amplifier may be derived from the disturbances developed in another amplifier or amplifiers of the system.

Further objects and features of the invention will be apparent from the following description, taken in connection with the accompanying drawing, in which Figure 1 is a wiring diagram of a seismic system to which the principles of the invention have been applied; and Figure 2 is a diagram of a portion of the system shown in Figure 1, illustrating a slight modification thereof.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

Figure 1 of the drawing illustrates the application of the invention to a system which employs, for convenience, only two seismometers. However, the invention has proven entirely satisfactory in its application to systems employing a much higher number of seismometers and associated amplifying circuits, for example eight or ten, and in its broader aspect, in which the counteracting A. C. component is derived from some source other than the preferred source herein specifically disclosed, is applicable to a system in which only one seismometer and associated amplifying circuit is used.

Since the illustration of two seismometers and amplifying units involves considerable duplication, one of these seismometers and its associated amplifying unit will be particularly referred to herein, the same reference numerals with the distinguishing subscript "1" being employed to designate corresponding elements of the other seismometer and its associated amplifying unit.

At 10 is diagrammatically represented a detector unit or seismometer; the type of seismometer employed and the details thereof form no part of the instant invention. Thus the seismometer may be of the capacitive type and constructed as disclosed in the application of Olive S. Petty, Serial No. 324,013, filed March 14, 1940, or of the magnetic type and constructed as disclosed in the application of Olive S. Petty, Serial No. 318,739, filed February 13, 1940. Such seismometers may employ an output transformer, and the secondary winding of such a transformer is represented at 12, the remaining structure and electrical circuit being omitted for the sake of clarity. A resistance 13 may be arranged in shunt with the transformer secondary, the center tap of the resistance being connected to the casing 14 of the seismometer which is usually grounded.

It will be understood that regardless of the nature of the seismometer employed, seismic impulses arriving at the seismometer are converted thereby into wave-form electrical impulses which are transmitted from the secondary winding 12 of the output transformer through insulated conductors 16 and 17 to an amplifying unit indicated generally at 20. The amplifying unit or units are usually mounted, for convenience in transporting and operating the same, in a truck which may be located at some distance from the several seismometers, and the seismometers are ordinarily spaced to a considerable extent. Thus the conductors are of sufficient length to permit the development therein of extraneous electrical disturbances of substantial proportion, particularly when laid on or in damp earth.

The conductors 16 and 17 are preferably connected to the primary winding 23 of an input transformer 22, the terminals of the secondary windings 24 of which are connected respectively to the grid 26 and cathode 27 of a thermionic valve 25. The anode 28 of the valve 25 delivers current through the primary winding 29 of a transformer 30, the anode circuit being completed through a source 31 of anode voltage to the cathode 27. The secondary winding 33 of transformer 30 may supply energy to one or more further amplifying stages, but for convenience the winding is shown directly connected to input terminals 37 and 38 of a recorder 35 which may be constructed in any conventional manner, for example as disclosed in the application of Olive S. Petty, Serial No. 378,115, filed February 8, 1941.

The details of the structure thus far described constitute no part of the instant invention, serving merely to represent one of many and widely varying forms of seismic system to which the invention may be applied.

I prefer to control the magnitude of the introduced A. C. component by regulating the potential difference between each pair of conductors 16 and 17 adjacent the associated amplifying unit, and to this end I may provide a potentiometer 40 in shunt with the primary winding 23 of transformer 22. The movable contact 41 of the potentiometer is connected through a switch 43 and a phase shifting device indicated generally at 45 to the casing or chassis of the amplifying unit 20, as shown at 46, the chassis of the several amplifying units being electrically connected and preferably grounded. As illustrated, the phase shifting device consists essentially of a variable resistance 47 and a condenser 48 arranged in parallel; this is a convenient and inexpensive form of device, but one which may be replaced, if desired, by widely varying forms of phase shifting structure.

In operation, if no unwanted A. C. disturbance is present at the recorder, the switch 43 may be opened. If, however, an unwanted A. C. component appears in the record, switch 43 is closed and the potentiometer 40 is adjusted to a position such that the disturbance is reduced to a minimum. The phase shifting device 45 is then adjusted, by manipulation of the resistance 47, to effect further reduction of the disturbing energy. The potentiometer 40 is then re-adjusted slightly to substantially eliminate the disturbance. Adjustment of each amplifying unit is in turn effected, and it is found that in general this requires little or no re-adjustment of the controls on previously adjusted amplifiers, especially in the event of use of a considerable number of amplifiers, grounded at a common point as suggested.

It is my belief that the successful operation of the apparatus shown herein is based on the introduction into each amplifying unit of a balancing or counteracting A. C. component, preferably derived from the source of the disturbance, and having such magnitude and phase relation with the over-all A. C. disturbance in the amplifier, introduced in the system at various points, that the effect of such disturbance is rendered negligible. To this end, it is probably preferable that the potential difference at the amplifier end of the conductors 16 and 17 shall not be precisely equalized, but that a slight voltage difference be established at any given instant which is just sufficient in magnitude to cancel the overall undesired disturbance. Thus in the preferred embodiment of the invention, the potentiometer 40 affords a convenient means of adjusting the amplitude of the balancing component, the correct phase relation is established by adjustment of the phase shifting device 45, and the source of the balancing component is the current flowing to any one amplifying unit from another unit or units of the system. In practice, I have satisfactorily employed a potentiometer 40 having a total resistance of 5,000 ohms and a phase shifting device of which the resistance 47 has a value of 300,000 to 500,000 ohms and the condenser 48 has a capacity of from .02 to .05 mfd., but these values are merely representative and not critical.

In Figure 2 of the drawing is illustrated a slight modification, in which the potentiometer 40 of Figure 1 is replaced by a potentiometer 50 which is located between sections 51 and 53 of the primary winding of a transformer 52, the latter constituting the input transformer of the amplifier. The construction may be otherwise identical to that shown in Figure 1, the movable contact of the potentiometer 50 being connected through the phase shifting device 45 to the chassis of the amplifying unit. As in the first described embodiment, the potentiometer is, in effect, across the amplifier input and its function is the same as that hereinbefore described.

Having thus described the invention, what is claimed as new and desired to be secured by Letters Patent is:

1. In a system for use in seismic surveying, the combination with a plurality of seismometers, of separate signal amplifying means for each seismometer, conductors for signal energy extending between each seismometer and the amplifying means therefor, means disposed adjacent each of said amplifying means and acting between the associated conductors for regulating the potential difference between said conductors resulting from unwanted alternating current flow in said conductors, and means connecting the regulating means for different amplifiers, said last named means including phase shifting means.

2. In a system for use in seismic surveying, the combination with a plurality of seismometers, of separate signal amplifying means for each seismometer, conductors for signal energy extending between each seismometer and the amplifying means therefor, a potentiometer across the input of each of said amplifying means, and a phase changing network interposed between the adjustable element of each potentiometer and a common grounded terminal.

3. In a system for use in seismic surveying, said system being subject to extraneous A. C. disturbance, and including a plurality of seismometers, a separate signal amplifier for each seismometer, and conductors for signal energy extending between each seismometer and the amplifier therefor, the combination with means connecting said amplifiers for introducing in one amplifier an A. C. component derived from the extraneous disturbance in another amplifier, said last named means including a phase shifting device, of means for regulating the magnitude of the component thus introduced, whereby the component so introduced in an amplifier may be adjusted to oppose and substantially balance out the extraneous disturbance in such amplifier.

4. In a system for use in seismic surveying, said system being subject to extraneous A. C. disturbance, and including a plurality of seismometers, a separate signal amplifier for each seismometer, and conductors for signal energy extending between each seismometer and the amplifier therefor, the combination with means connecting said amplifiers for introducing in a first amplifier an A. C. component derived from the extraneous disturbance in another amplifier, said last named means including a phase shifting device, of means including a potentiometer associated with the input of said first amplifier and connected to said phase shifting device for regulating the magnitude of the component thus introduced, whereby the component so introduced in an amplifier may be adjusted to oppose and substantially balance out the extraneous disturbance in such amplifier.

5. In a system for use in seismic surveying, said system being subject to extraneous A. C. disturbance, and including a plurality of seismometers, a separate signal amplifier for each seismometer, conductors for signal energy extending between each seismometer and the amplifier therefor, and a recorder for the amplified signal energy, the combination with a plurality of potentiometers, one connected across the input of each amplifier, of a phase shifting device connected between the variable element of each potentiometer and a common grounded terminal.

6. In a method of seismic surveying which involves firing an explosive charge to create seismic waves in the earth, detecting said waves at a plurality of remote points and converting the same to separate electrical wave-form signals, transmitting said wave-form signals to a further point and there separately amplifying and recording the same, in the course of which method an extraneous A. C. disturbance adversely affecting the recording of the signal is superimposed on the latter, the steps which comprise combining with each of said signals an A. C. component derived from the extraneous disturbance superimposed on at least one of the other signals, and adjusting the magnitude of each such component and the phase relation thereof with the extraneous disturbance to substantially counteract the effect of the latter on the record of the signal with which the component is combined.

JOSEPHUS O. PARR, Jr.